(12) United States Patent
Kumagai et al.

(10) Patent No.: US 11,933,804 B2
(45) Date of Patent: Mar. 19, 2024

(54) AUTOMATIC ANALYZER

(71) Applicant: HITACHI HIGH-TECH CORPORATION, Tokyo (JP)

(72) Inventors: Takahiro Kumagai, Tokyo (JP); Kazuhiro Noda, Tokyo (JP); Yukinori Sakashita, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 540 days.

(21) Appl. No.: 17/266,674

(22) PCT Filed: May 29, 2019

(86) PCT No.: PCT/JP2019/021205
§ 371 (c)(1),
(2) Date: Feb. 8, 2021

(87) PCT Pub. No.: WO2020/044688
PCT Pub. Date: Mar. 5, 2020

(65) Prior Publication Data
US 2021/0318350 A1   Oct. 14, 2021

(30) Foreign Application Priority Data

Aug. 28, 2018   (JP) ................. 2018-158868

(51) Int. Cl.
*G01N 35/10* (2006.01)
(52) U.S. Cl.
CPC ..... *G01N 35/1016* (2013.01); *G01N 35/1011* (2013.01); *G01N 2035/103* (2013.01)

(58) Field of Classification Search
CPC .......... G01N 35/1016; G01N 35/1011; G01N 2035/103; G01N 2035/1013; G01N 2035/0498
See application file for complete search history.

(56) References Cited

U.S. PATENT DOCUMENTS

2002/0176803 A1* 11/2002 Hamel ............... G01N 35/1002
422/511
2005/0178795 A1* 8/2005 Inoue .................. G01N 35/1009
222/23

(Continued)

FOREIGN PATENT DOCUMENTS

| JP | H11-287812 A | 10/1999 |
|----|--------------|---------|
| JP | 2005-049197 A | 2/2005 |

(Continued)

OTHER PUBLICATIONS

Extended European Search Report, dated Jun. 9, 2022, for European Application No. 19855376.0.

(Continued)

*Primary Examiner* — Helen C Kwok
(74) *Attorney, Agent, or Firm* — Baker Botts, L.L.P.

(57) ABSTRACT

In a case where a dispensing tip is imaged from below, liquid attached to the tip falls downward and contaminates an imaging mechanism. An automatic analyzer includes: a buffer that has a hole for holding a tip for dispensing, the hole passing through the tip; a probe for dispensing having a tip to which the tip is attached; an imaging unit that images the tip; and a controller that controls the tip such that the tip is mounted on the probe by pressing the probe against the tip that passes through the hole to be held by the buffer, in which the imaging unit is disposed to image the tip from an upper side to a lower side in a gravity direction.

12 Claims, 12 Drawing Sheets

(56) References Cited

U.S. PATENT DOCUMENTS

| | | | |
|---|---|---|---|
| 2006/0051246 A1* | 3/2006 | Toi | G01N 35/1011 422/561 |
| 2013/0065797 A1 | 3/2013 | Silbert et al. | |
| 2013/0280143 A1* | 10/2013 | Zucchelli | G01N 35/026 422/501 |
| 2013/0288873 A1 | 10/2013 | Barbee et al. | |
| 2014/0036070 A1* | 2/2014 | Eckard | G06T 7/74 348/135 |
| 2015/0037803 A1* | 2/2015 | Park | G01N 35/0099 435/6.12 |
| 2015/0268179 A1* | 9/2015 | Sakuta | G06F 1/1692 378/44 |
| 2016/0334431 A1* | 11/2016 | Noda | G01N 35/0099 |
| 2017/0269115 A1* | 9/2017 | Schmidt | G06T 7/0008 |
| 2018/0348247 A1* | 12/2018 | Ando | G01N 35/1011 |
| 2020/0217863 A1* | 7/2020 | Kumagai | G01N 35/00732 |
| 2021/0239727 A1* | 8/2021 | Sakairi | G01N 35/10 |
| 2022/0091147 A1* | 3/2022 | Kurnianto | B01L 3/0237 |

FOREIGN PATENT DOCUMENTS

| | | |
|---|---|---|
| JP | 2010-181278 A | 8/2010 |
| JP | 2014-526687 A | 10/2014 |
| JP | 2017-161517 A | 9/2017 |

OTHER PUBLICATIONS

International Search Report, dated Sep. 3, 2019, for International Application No. PCT/JP2019/021205.

* cited by examiner

AUTOMATIC ANALYZER

TECHNICAL FIELD

The present invention relates to an automatic analyzer.

BACKGROUND ART

In an automatic analyzer, there is an increasing demand for reducing an amount of a sample (specimen) in order to increase the number of analysis items and reduce a burden on patients. Therefore, in order to reduce an amount of the sample (a dead volume) that is not used for analysis and remains in a sample container, a diameter of the sample container is being reduced. In order to perform appropriate dispensing to the sample container having a smaller diameter, it is required to properly align a stop position and a dispensing position of the sample container. Here, a technique is disclosed for detecting a deviation between a lower end portion of a dispensing tip and a center position of a holder based on an image of the lower end portion of the dispensing tip (see PTL 1).

CITATION LIST

Patent Literature

PTL 1: JP-A-H11-287812

SUMMARY OF INVENTION

Technical Problem

According to PTL 1, since the dispensing tip is imaged from below, there is a problem that a liquid attached to the tip falls downward and contaminates an imaging mechanism.

Therefore, an object of the invention is to provide an automatic analyzer that performs accurate dispensing position control with an imaging mechanism not contaminated.

Solution to Problem

An automatic analyzer according to an aspect of the invention includes: a buffer that has a hole through which a tip for dispensing passes so as to hold the tip; the hole passing through the tip; a probe for dispensing having a tip to which the tip is attached; an imaging unit that images the tip; and a controller that controls the tip such that the tip is mounted on the probe by pressing the probe against the tip that passes through the hole to be held by the buffer, in which the imaging unit is disposed to image the tip from an upper side to a lower side in a gravity direction.

Advantageous Effect

According to the invention, it is possible to provide an automatic analyzer that performs accurate dispensing position control with an imaging mechanism not contaminated.

DESCRIPTION OF EMBODIMENTS

An embodiment will be described below with reference to the drawings.

Figure 1:
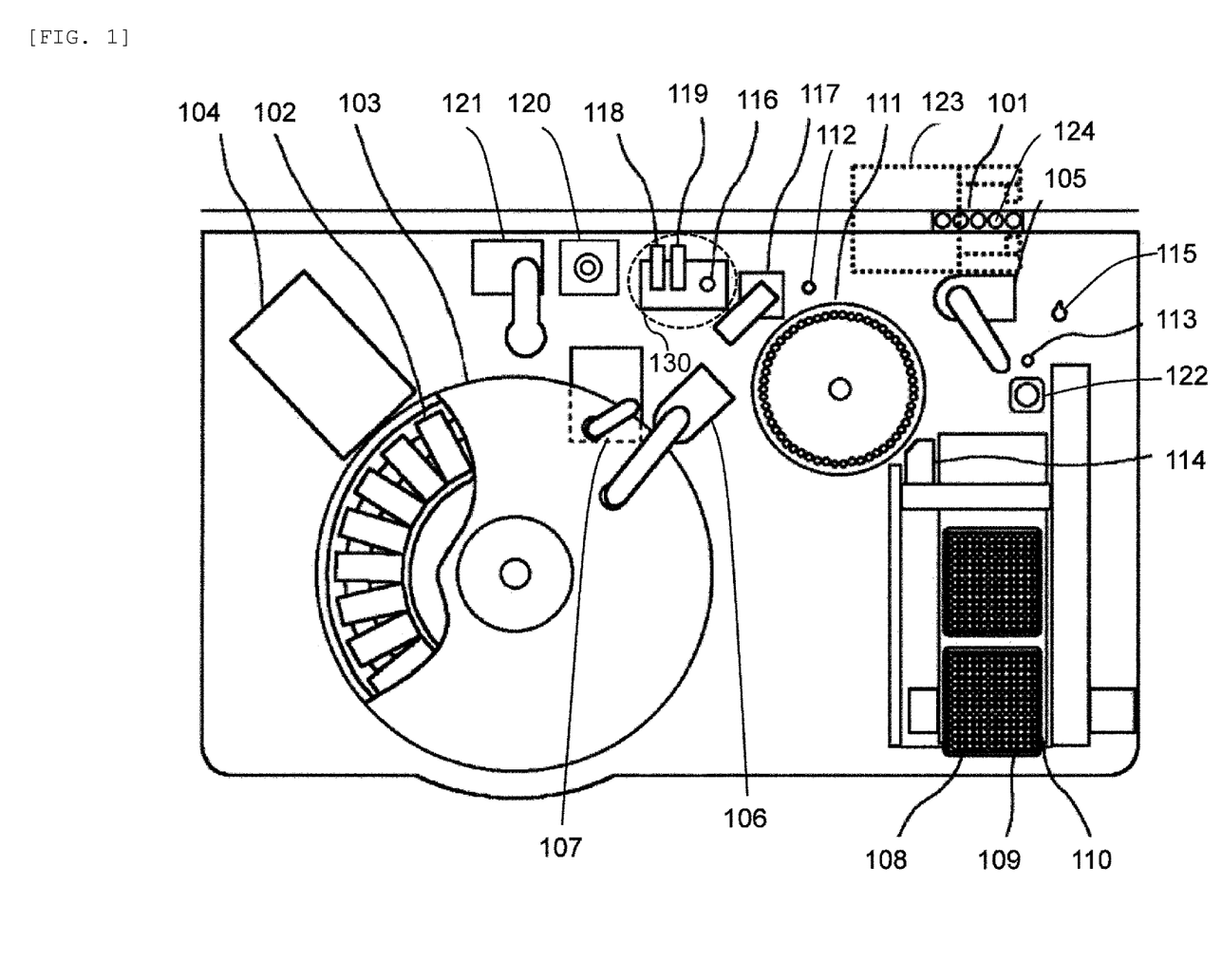
FIG. 1 is an overall view illustrating an automatic analyzer.

FIG. 1 is an overall view illustrating an automatic analyzer. The automatic analyzer includes: a sample rack 101 on which a sample container 124 is placed; a container holding device 123 that holds the sample container 124; a reagent holding unit 103 that holds a plurality of reagent containers 102 containing a reagent; a magazine (a storage box) 110 that stores a reaction container 108 and a disposable tip (hereinafter, referred to as the tip) 109 for dispensing a sample; a reaction unit (an incubator) 111 that houses a plurality of reaction containers 108 and promotes a reaction of the sample and a reagent in the reaction container 108; a container wasting unit 112 where the reagent container 108 is discarded; a tip wasting unit 115 where the tip 109 is wasted; a magnetic separation mechanism 130; a detector 120; a reagent discharging mechanism 121 that discharges the reagent to the reaction container 108 transported to the detector 120; a container lid opening and closing mechanism 104 that opens and closes a lid of the reagent container 102; a sample dispensing unit 105 that collects and dispenses the sample from the transported sample rack 101 using a sample probe 601; a reagent dispensing unit 106 that collects and dispenses the reagent from the reagent container 102 using a reagent probe; a magnetic particle stirring mechanism 107; a buffer 113 that temporarily stores the tip 109 for dispensing the sample; a first transport mechanism 114 that transports the reaction container 108 to the reaction unit 111 or the buffer 113; an imaging unit 122 that is disposed close to the buffer 113 and images the sample dispensing unit 105; and a second transport mechanism 117 that transports the reaction container 108 between the reaction unit 111, the magnetic separation mechanism 130, the detector 120, the container wasting unit 112, or the like.

The magnetic separation mechanism 130 includes a magnetic separator 116, an impurity aspirating mechanism 118, and a cleaning liquid discharging mechanism 119. The impurity aspirating mechanism 118 aspirates a liquid containing impurities in the reaction container 108 transported to the magnetic separator 116, and the cleaning liquid discharging mechanism 119 discharges a cleaning liquid into the reaction container 108.

As a method of transporting the sample rack 101, there are a method of installing the sample rack 101 on a belt and performing transportation by the belt, a method of using a disk in which the sample rack 101 itself rotates to transport a container, a method of using a disk in which a transport device installs a sample and transports the sample by rotation, a method of moving the sample rack 101 by grasping or lifting, and the like.

Next, operations of the automatic analyzer will be described. First, the first transport mechanism 114 transports the reaction container 108 from the magazine 110 onto the reaction unit 111, and transports the tip 109 to the buffer 113. The reaction unit 111 rotates and moves the transported reaction container 108 to a reagent dispensing position. Then, the reagent dispensing unit 106 dispenses the reagent from the reagent holding unit 103 to the reaction container 108 on the reaction unit 111.

The reaction unit 111 rotates again to move the reaction container 108 to a sample dispensing position. The tip 109 of the buffer 113 is mounted on the sample probe 601 by a vertical movement of the sample dispensing unit 105. The sample dispensing unit 105 collects the sample from the sample container 124 on the sample rack 101, and dispenses the sample into the reaction container 108 moved to the sample dispensing position. At the time of collection, the sample container 124 is held by the container holding device 123. The used tip 109 is removed from the sample dispensing unit 105 by the vertical movement of the sample dispensing unit 105, and is discarded to the tip wasting unit 115.

The reaction container 108, in which the sample and the reagent are dispensed, is heated in the reaction unit 111 for a certain period of time, and then moved to the reagent dispensing position by rotation of the reaction unit 111. Next, the reagent dispensing unit 106 collects magnetic particles from the reagent holding unit 103, and dispenses the magnetic particles into the reaction container 108 at the reagent dispensing position. Further, after the reaction container 108 is heated by the reaction unit 111 for a certain period of time, the reaction unit 111 rotates, and the second transport mechanism 117 transports the reaction container 108 on the reaction unit 111 to the magnetic separator 116.

On the magnetic separator 116, a magnetic component containing a reaction product and a non-magnetic component containing impurities in the reaction container 108 are separated. That is, aspiration by the impurity aspirating mechanism 118 and discharge of the cleaning liquid by the cleaning liquid discharging mechanism 119 are repeated several times, and finally only the magnetic component containing the reaction product is left in the reaction container 108. The reaction container 108 is transported to the detector 120 by the second transport mechanism 117. Thereafter, the reagent discharging mechanism 121 discharges the reagent for detection into the reaction container 108, and the detection is performed. The reaction container 108 for which the detection is completed is discarded by the second transport mechanism 117 to the container wasting unit 112. Thereafter, the above-mentioned operations are repeated for a subsequent sample.

Here, in an automatic immunological analyzer, a tip (a consumable) is used in order to prevent carryover and ensure analysis performance. In order to further improve a reliability of the analysis, it is desirable to control a dispensing position for each tip used in each analysis. Therefore, an example of an automatic immunological analyzer using a tip will be described below.

Figure 2:
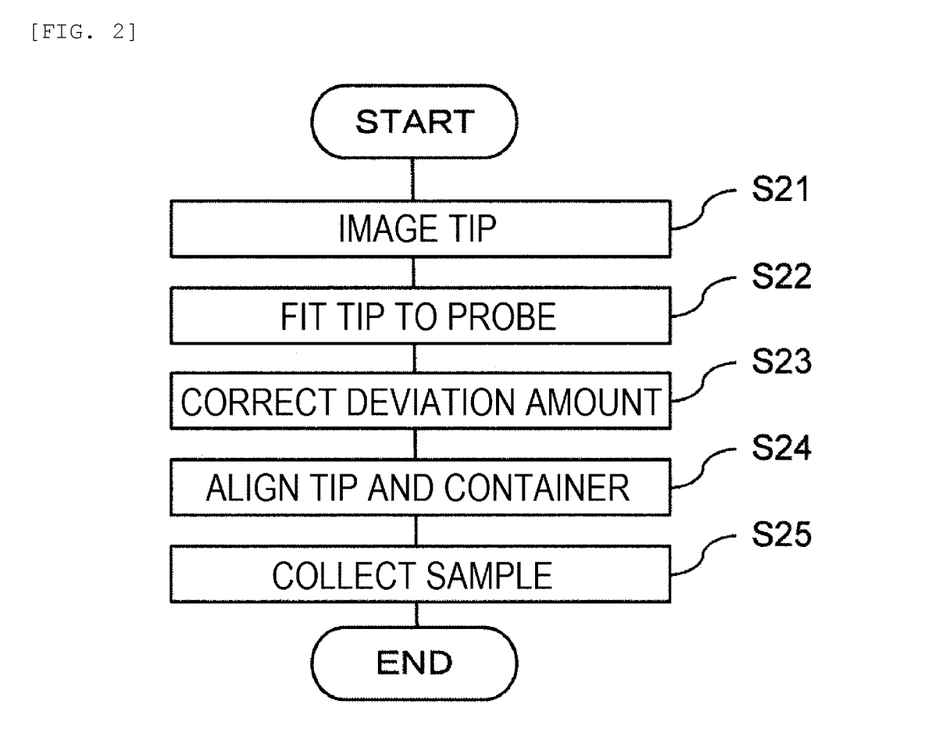
FIG. 2 is a diagram illustrating a flow of a dispensing position control.

FIG. 2 is a diagram illustrating a flow of a dispensing position control. First, the imaging unit 122 images the tip held by the buffer 113 (S21). A measurement by the imaging unit 122 may be performed for each analysis, or may be performed at other timings. Here, the buffer 113 is a mounting base having a hole through which the tip 109 passes so as to hold the tip 109. Next, the sample dispensing unit 105 moves the sample probe 601 to an upper side of the tip 109 of the buffer 113, inserts the sample probe 601 into a hole at an upper end portion of the tip 109 by a lowering operation, and presses the sample probe 601 against an inner wall of the buffer 113. As a result, the tip 109 fits into the sample probe 601 (S22). Next, an image processing unit 301 (the correcting unit) connected to the imaging unit 122 corrects a deviation amount between a center position of a lower end portion (tip portion) of the tip 109 and a center position of the sample container 124 based on an acquired image (S23). Next, a controller 302 connected to the image processing unit 301 controls, based on a correction value of the deviation amount, a stop position of the sample probe 601 such that the lower end portion of the tip 109 is at a region immediately above the center position of the sample container 124 (S24). A position correction between the center position of the tip 109 and the center position of the sample container 124 may be performed only by the sample probe 601, or may be performed by a combination of the transport mechanism of the sample rack 101 and the container holding device. Then, the sample dispensing unit 105 collects the sample from the sample container 124 on the sample rack 101 (S25).

Figure 3:
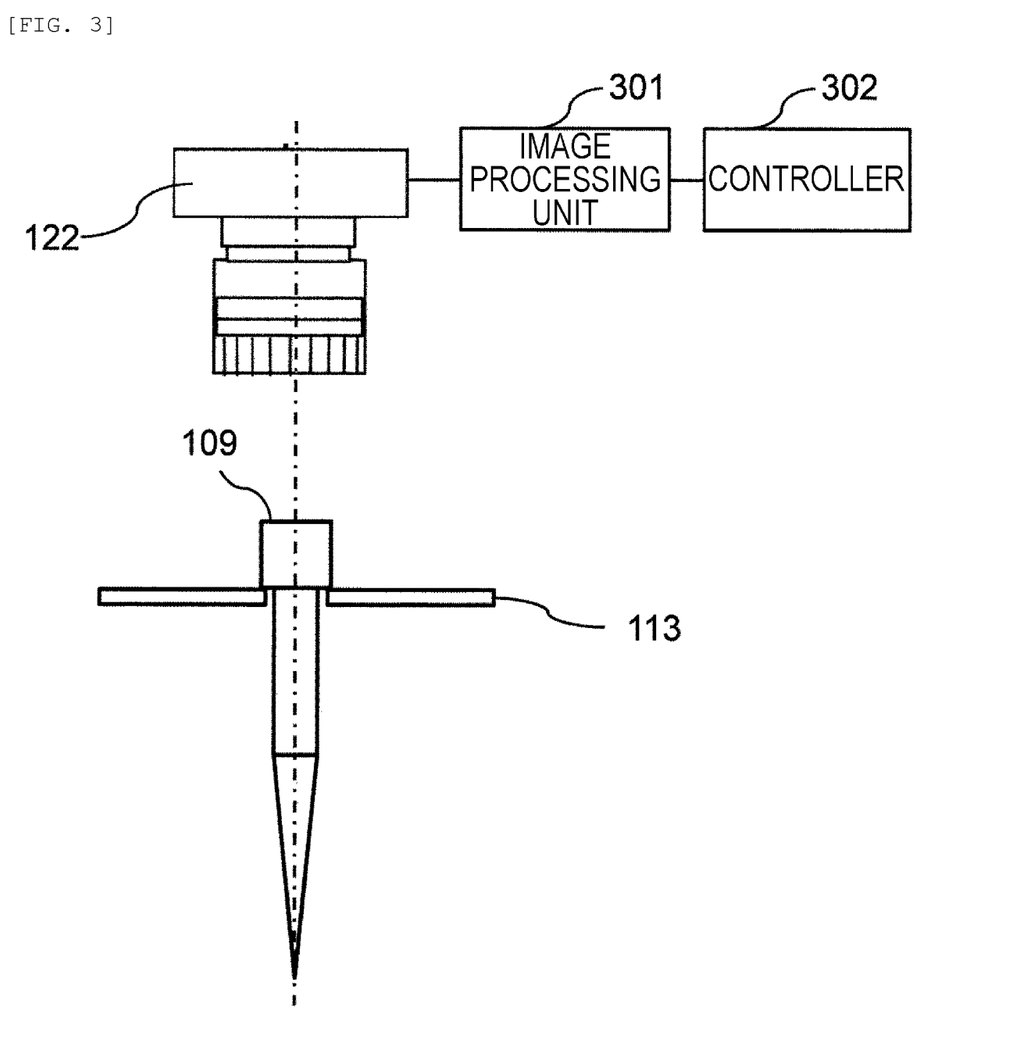
FIG. 3 is a diagram illustrating a state where one end of a tip is measured in an imaging unit.
Figure 6:
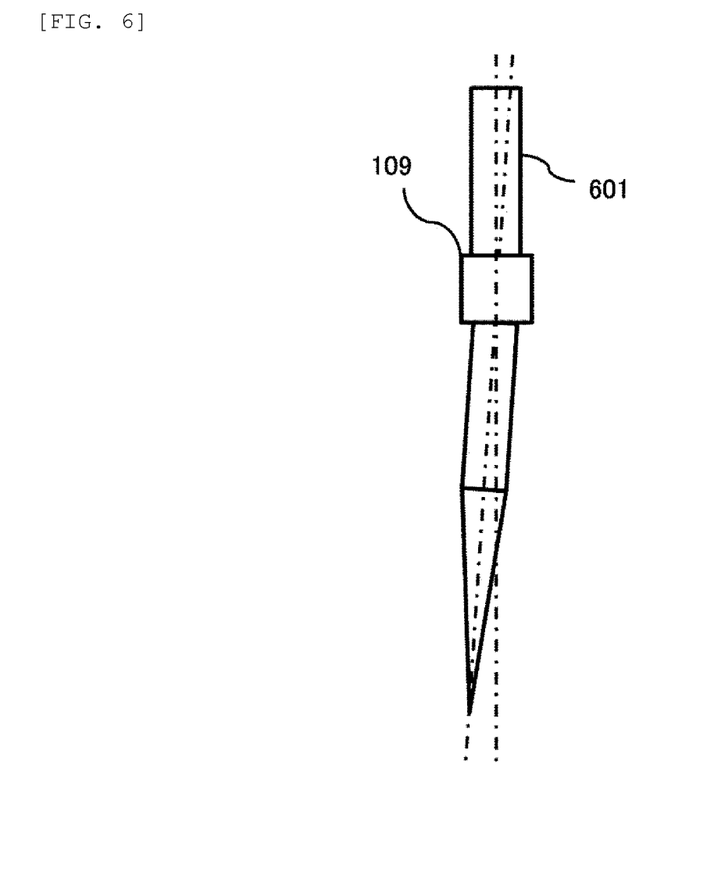
FIG. 6 is a diagram illustrating a state where a molding state of the tip is bent.

Here, when there is a problem in a forming state of the tip 109 (see FIG. 6), it may be one of factors of variation, and thus it is necessary to detect an accurate positional relationship between the sample probe 601 and the tip 109. On the other hand, as described above, when the tip 109 is imaged from below in order to grasp the positional relationship, an imaging mechanism may be contaminated. Therefore, in the present embodiment, before the sample probe 601 and the tip 109 are fitted together, the tip 109 is imaged from an upper side to a lower side in a gravity direction in a state where the sample probe 601 is not present in a region immediately above the tip 109 (FIG. 3).

This method utilizes the matter that when the sample probe 601 is inserted into the hole at the upper end portion of the tip and pressed against the buffer, the center position of the sample probe 601 and the center position of the upper end portion of the tip match due to inertia. That is, it is not necessary to image the sample probe 601, and it is only necessary to know the center position of the upper end portion of the tip and the center position of the hole at the tip portion of the tip (hereinafter, referred to as the tip hole).

Figure 4:
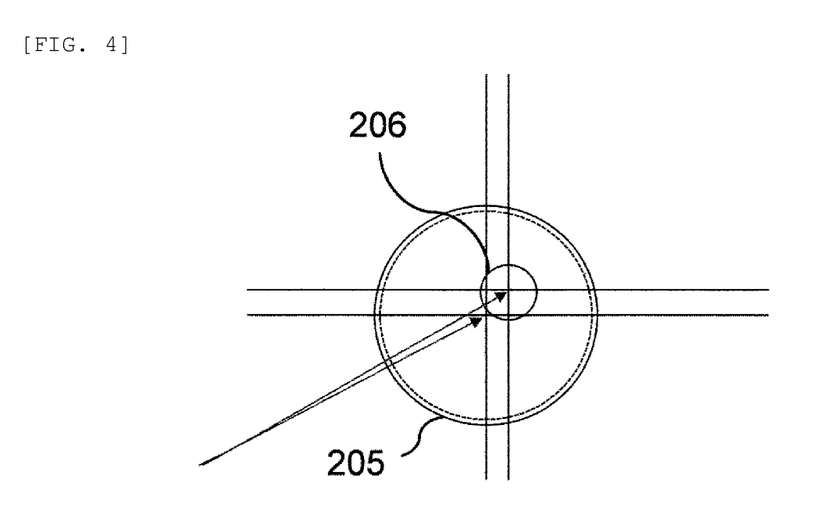
FIG. 4 is a diagram illustrating an image in a case where the tip is imaged from above.

FIG. 4 is a diagram illustrating an image in a case where the tip is imaged from above. In the image of the sample probe 601 imaged from above, it is difficult to compare the center position of the sample probe 601 with a center position of a tip hole 206. However, when an image is taken from the upper side to the lower side in the gravity direction in a state where the sample probe 601 is not present, respective boundary lines of an outer circumference 205 and the tip hole 206 of the lower end portion of the tip are clearly projected (a small circle is projected inside a large circle). In this way, a deviation amount between the outer circumference 205 and the tip hole 206 can be regarded as a deviation amount between the center position of the sample probe 601 and the center position of the tip hole 206, and a correction value can be obtained.

Considering only a viewpoint of contamination prevention, since no liquid is attached to the tip at this point, it is conceivable to image the tip 109 from the lower side to the upper side in the gravity direction. However, considering a viewpoint of clarity of the image described above or a viewpoint of securing a space in the automatic analyzer, it is desirable to take an image from above the tip 109.

The sample probe 601 for collecting the sample moves to the sample dispensing position, and dispenses the sample into the reaction container 108. A position correction of the sample probe 601 and the reaction container 108 at this time is the same as a position correction of the sample probe 106 and the sample container 124. The sample dispensing unit 105 moves the tip 109, by which dispensing to the reaction container 108 is completed, above the tip wasting unit 115, and discards the tip 109 to the tip wasting unit 115 by removing the tip 109 from the sample probe 106 by the vertical movement.

Figure 5:
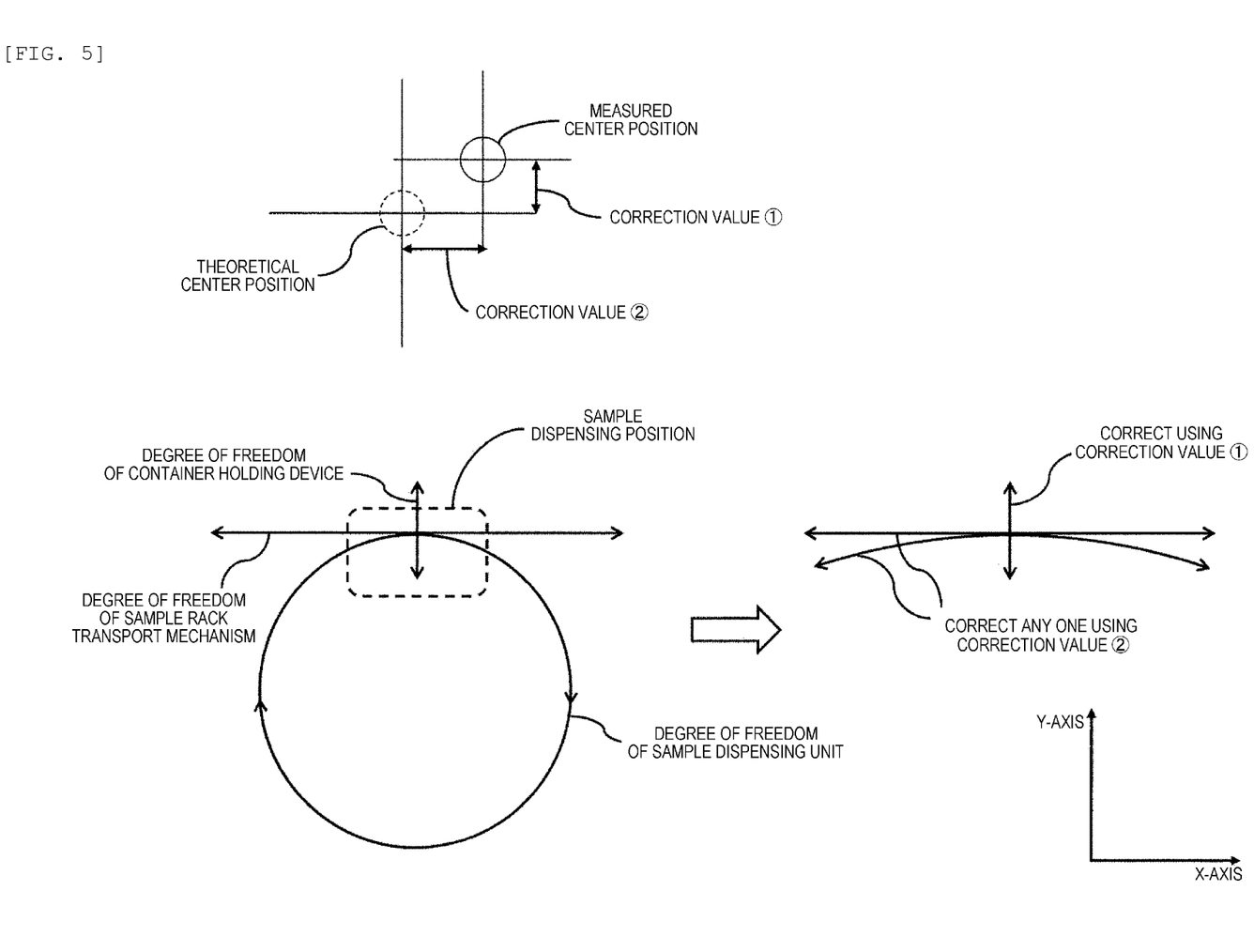
FIG. 5 is a diagram illustrating a method of correcting a position deviation.

FIG. 5 is a diagram illustrating a method of correcting a position deviation. Each position where the sample is aspirated and discharged by the sample dispensing unit 105 is corrected by the sample dispensing unit 105 or another mechanism based on an imaging result by the imaging unit 122. This correction is performed by giving information obtained from a position measurement of the tip 109 by the imaging unit 122 as a correction value to each mechanism having one or a plurality of independent degrees of freedom.

When a mechanism to which the correction value is given has a degree of freedom only in a specific position direction, the position correction can be performed only in the direction of the degree of freedom of the mechanism. On the other hand, when the correction value has a plurality of degrees of freedom in a plane direction, a tip position of the tip can be controlled to a position on any plane by giving the correction value to each of movable directions. Further, the tip position of the tip may be controlled by dividing and giving the correction value into a plurality of mechanisms having different degrees of freedom.

For example, at the sample dispensing position, there are a sample rack transport mechanism having a degree of freedom in an x-axis direction, a container holding device having a degree of freedom in a y-axis direction, and a sample dispensing unit having a degree of freedom in a rotation direction. When a correction amount at the tip position of the tip is sufficiently smaller than a driving amount of various mechanisms, the sample dispensing unit can be considered to have a degree of freedom in the x-axis direction at the sample dispensing position. That is, the tip position of the tip can be controlled to an appropriate dispensing position by giving a correction value in the y-axis direction to the container holding device and a correction value in the x-axis direction to the sample rack transport mechanism and the sample dispensing unit. In this way, even when the forming state of the tip 109 is bent (see FIG. 6), the reliability of sample dispensing can be improved by giving a correction value to a mechanism.

Figure 7:
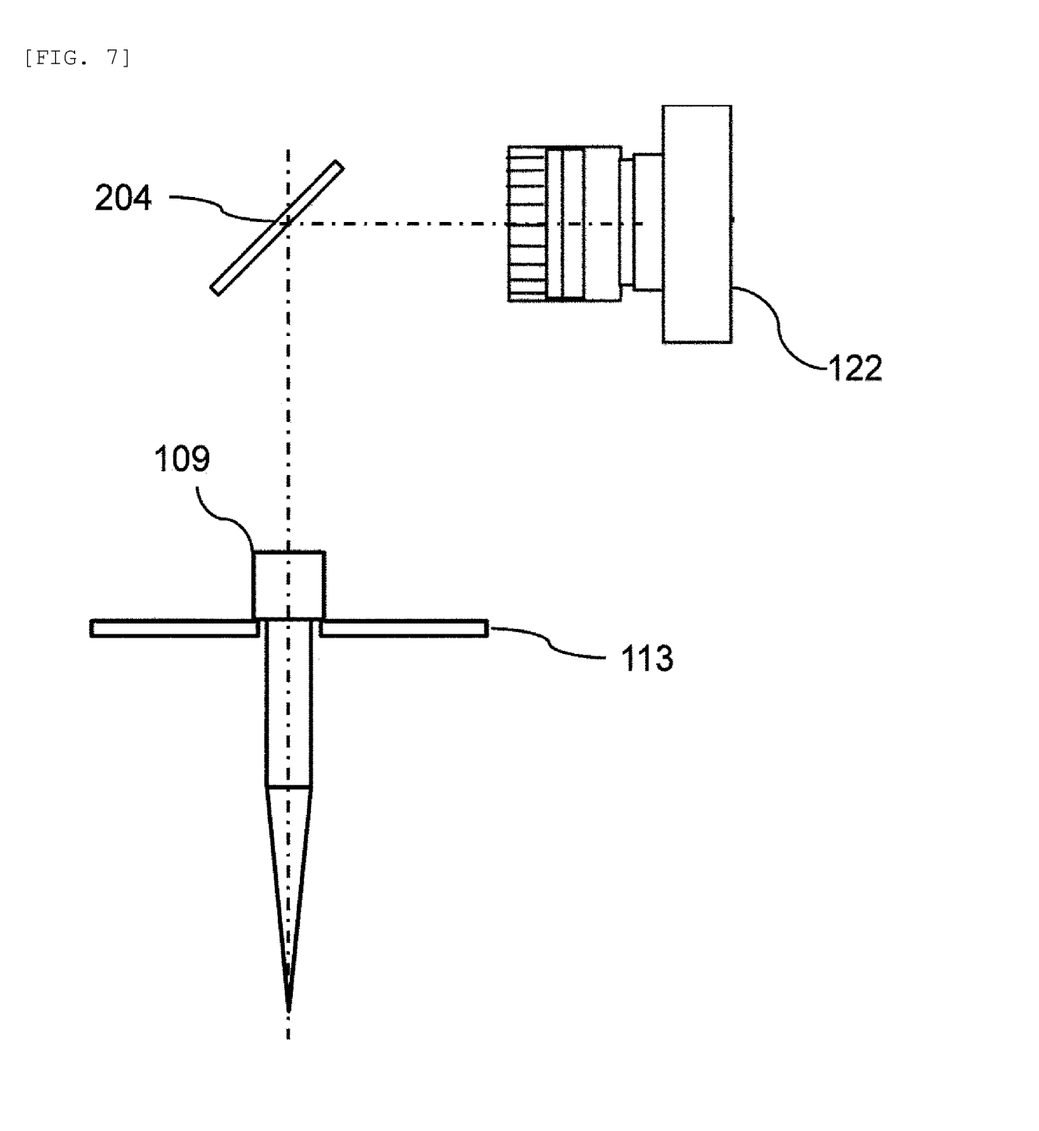
FIG. 7 is a diagram illustrating a state where the imaging unit images the tip from immediately above through a mirror.
Figure 8:
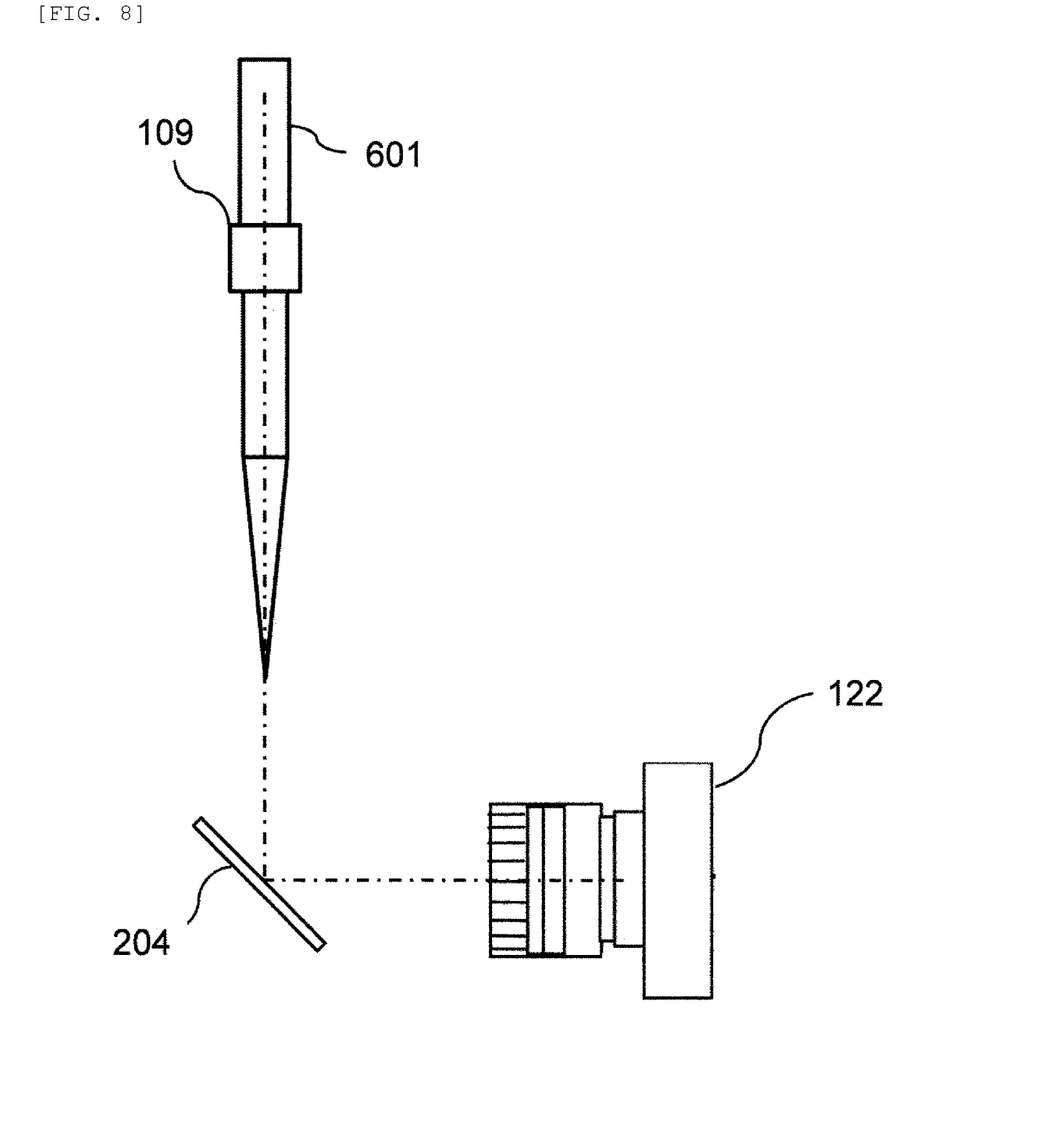
FIG. 8 is a diagram illustrating a state where the imaging unit images the tip from immediately below through the mirror.
Figure 9:
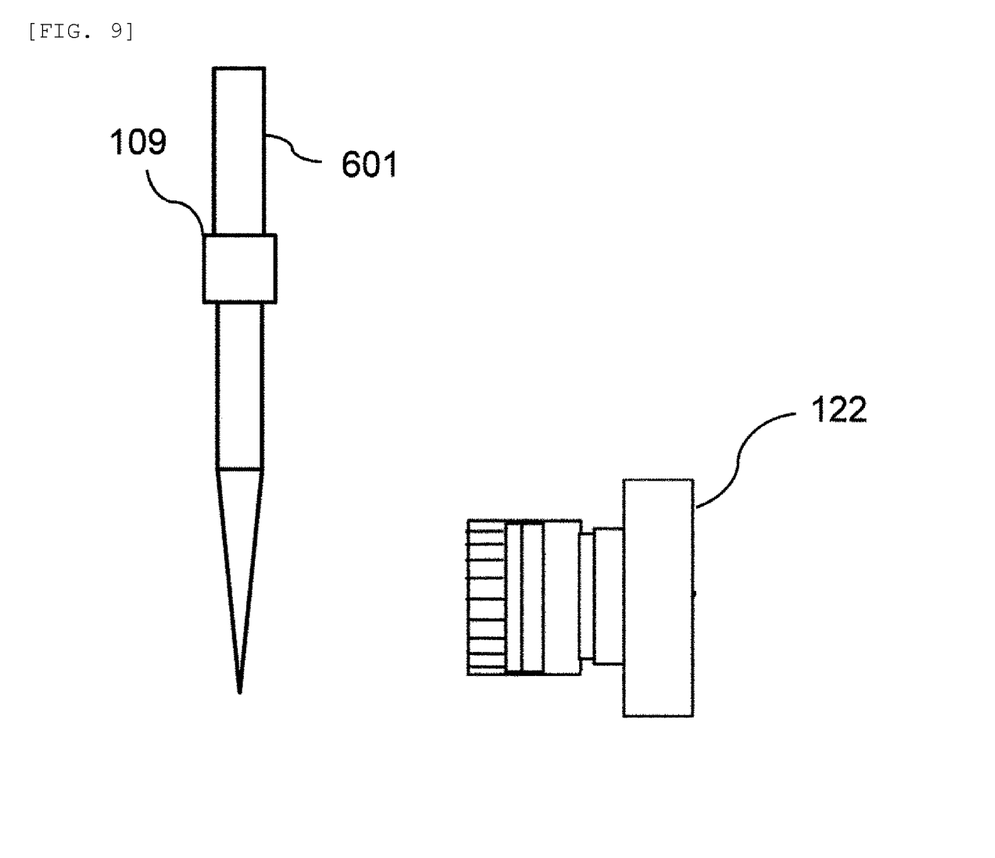
FIG. 9 is a diagram illustrating a state where the imaging unit images a lower side surface of the tip.
Figure 10:
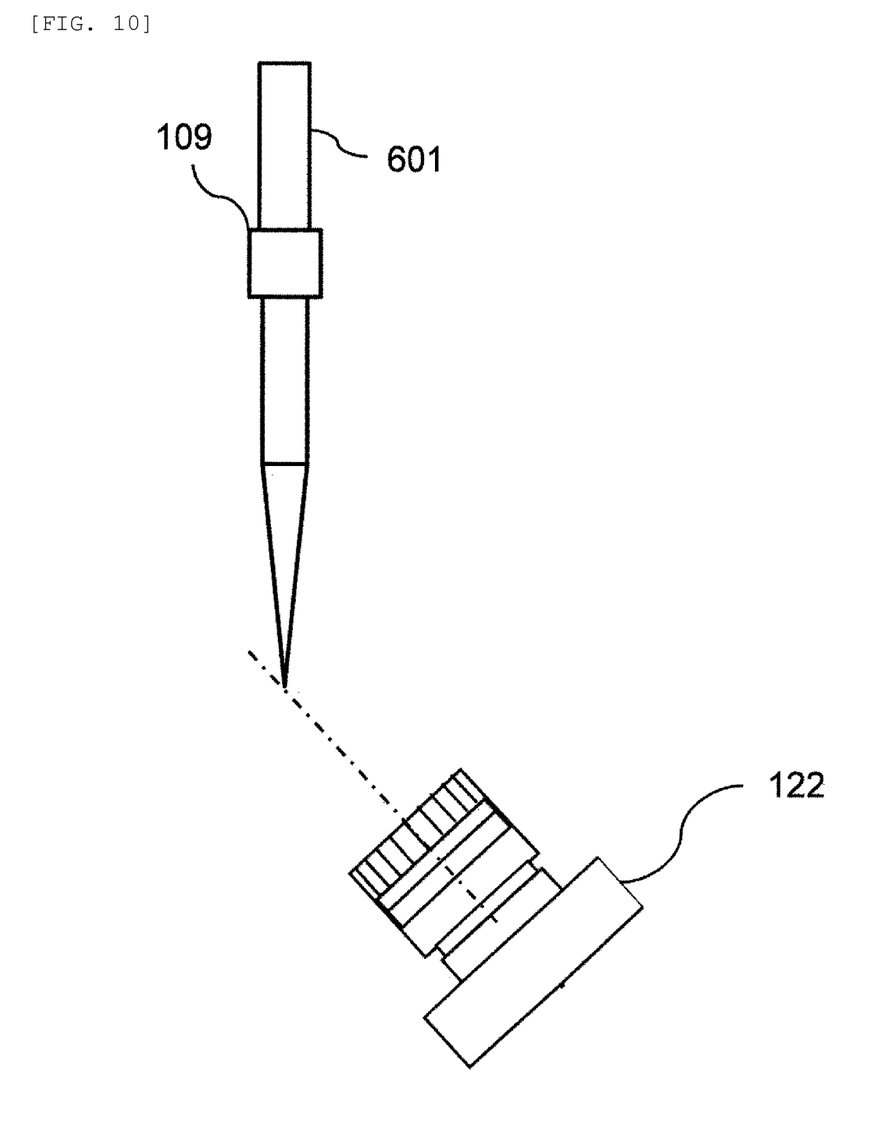
FIG. 10 is a diagram illustrating a state where the imaging unit images the tip from oblique below.
Figure 11:
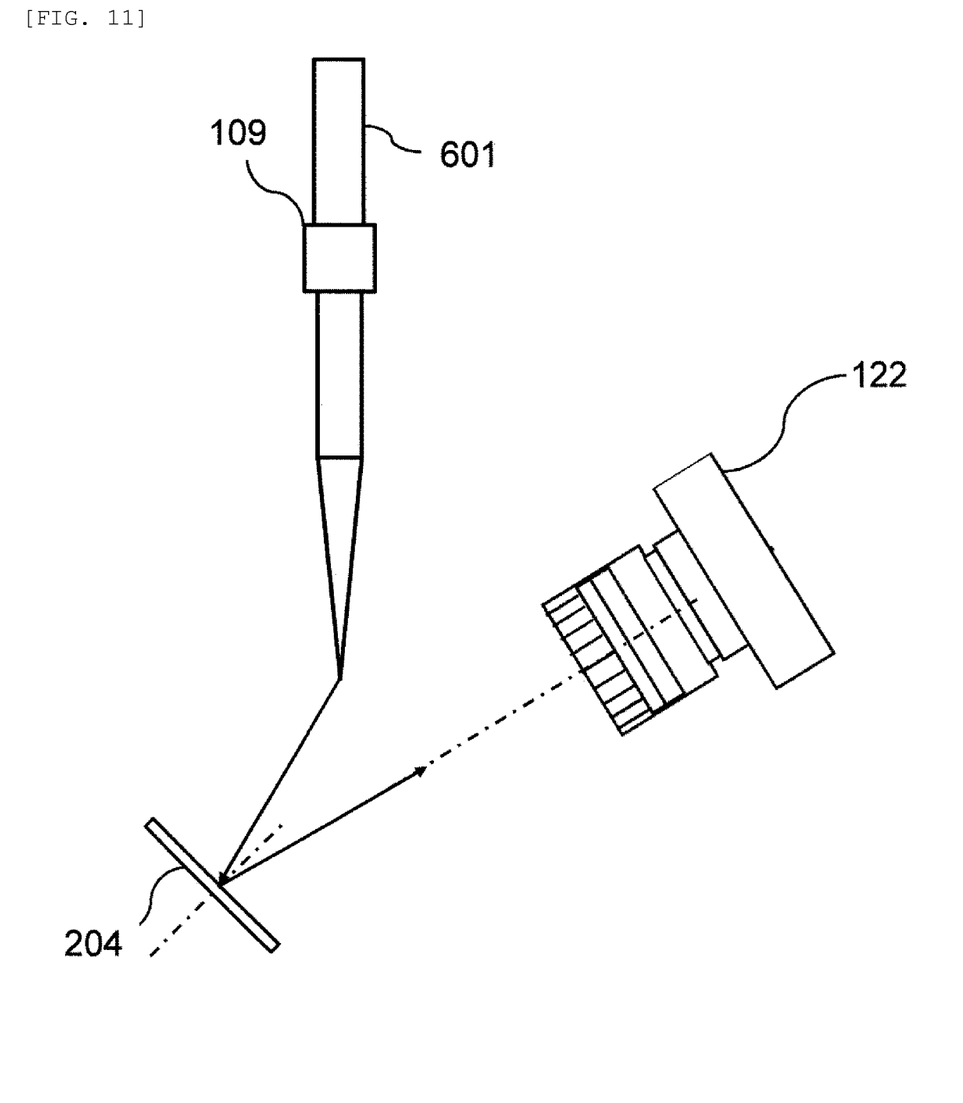
FIG. 11 is a diagram illustrating a state where the imaging unit images the tip from oblique below through the mirror.

Variations of arrangement will be shown below. FIG. 7 is a diagram illustrating a state where the imaging unit images the tip from immediately above through a mirror 204. FIG. 8 is a diagram illustrating a state where the imaging unit images the tip from immediately below through the mirror 204. FIG. 9 is a diagram illustrating a state where the imaging unit images a lower side surface of the tip. FIG. 10 is a diagram illustrating a state where the imaging unit images the tip from oblique below. FIG. 11 is a diagram illustrating a state where the imaging unit images the tip from oblique below through the mirror 204. An appropriate arrangement may be selected according to a layout of the automatic analyzer. From the viewpoint of the contamination prevention, it is possible to take an image from the lower side through the mirror as well, and thus such a state is shown in FIGS. 8 to 11, but it is desirable to take an image from the upper side as described above.

In addition, in order to acquire the correction value, it is desirable to install a plurality of imaging units 122, and image the sample dispensing unit 105 or the tip 109 from a plurality of directions, but only one imaging unit 122 may be installed to acquire only a one-dimensional correction value. Further, the sample dispensing unit 105 and the tip 109 may be directly imaged by the imaging unit 122, and a mirror may be installed to capture an image reflected in the mirror to obtain the correction value. The imaging by the imaging units 122 may be performed while the sample dispensing unit 105 is moving, or may be performed while the sample dispensing unit 105 is stopped.

Although not shown, the lower side surface of the tip may be measured using a sensor. For example, a sensor is installed such that statuses can be switched; a position where a detection result of the sensor is present when the sample dispensing unit 105 is moved, and a position where the detection result is switched from present to absent when the sample dispensing unit 105 is further moved are stored; and a median value of the positions may be defined as the tip position, and used as the correction value. The sensor determines a presence or absence of a substance in a certain region, and a type and a detection method of the sensor are not limited. For example, the sensor may be a reflective or transmissive photoelectric sensor, a sensor that utilizes reflection of ultrasonic waves, or a sensor that performs a detection based on a presence or absence of contact.

Figure 12:
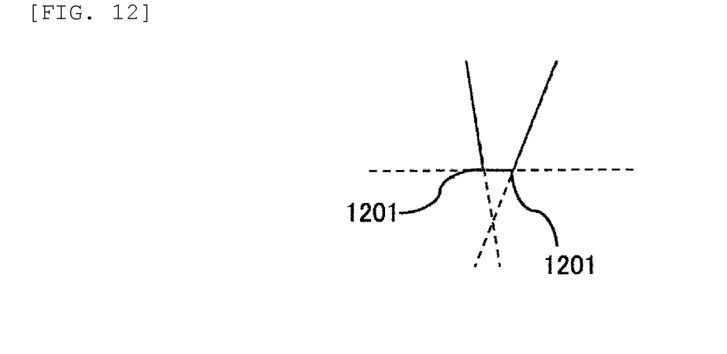
FIG. 12 is a diagram illustrating a relationship of intersections between two side surface positions and a tip portion of the tip.

In image analysis processing, the tip position may be derived from a tip shape of the imaged tip 109, or the tip position may be derived from a color distribution or a brightness distribution of the image. For example, as shown in FIG. 12, a center position of intersections 1201 between two side surface positions and the tip portion of the tip 109 may be derived as the tip position.

In the above embodiment, an immunoassay analyzer is described as an example, but the above embodiment can also be applied to an automatic biochemical analyzer, a mass spectrometer used for clinical examination, a coagulation analyzer that measures a coagulation time of blood, a composite system of these devices, or an automatic analysis system to which these devices are applied. For example, even when no tip is used as in the automatic biochemical analyzer, a tip position of a dispensing mechanism may change due to daily maintenance. Therefore, when no tip is used, the "tip" may be replaced with a "dispensing probe" and the present embodiment may be applied.

REFERENCE SIGNS LIST

101: sample rack
102: reagent container
103: reagent holding unit
104: container lid opening/closing mechanism
105: sample dispensing unit
106: reagent dispensing unit
107: magnetic particle stirring mechanism
108: reaction container
109: tip 110: storage box
111: reaction unit
112: container wasting unit
113: buffer
114: second transport mechanism
115: tip wasting unit
116: magnetic separator
117: first transport mechanism
118: impurity aspirating mechanism
119: cleaning liquid discharging mechanism
120: detector
121: reagent discharging mechanism
122: imaging unit
123: container holding device
124: sample container

The invention claimed is:

1. An automatic analyzer comprising:
a magazine that stores a plurality of tips for dispensing;
a probe for dispensing a sample;
a buffer that is a mounting base for mounting a tip on a tip portion of the probe, and has a first hole through which the tip passes so as to hold the tip;
an imaging unit that images the tip; and
a controller that controls the tip such that the tip is mounted on the probe by pressing the probe against the tip that passes through the first hole to be held by the buffer, wherein
the imaging unit is disposed to image the tip from an upper side to a lower side in a gravity direction, and
a deviation amount between an outer circumference of an upper end portion of the tip and a tip hole of a lower end portion of the tip is taken as a deviation amount between a center position of the probe and a center position of the tip hole.

2. The automatic analyzer according to claim 1, wherein the imaging unit images the tip before the probe moves to a region immediately above the tip.

3. The automatic analyzer according to claim 1, wherein the imaging unit images the tip in a state where the probe is not present in a region immediately above the tip.

4. The automatic analyzer according to claim 1, further comprising:
a mirror that is provided on an upper side of the buffer in the gravity direction, wherein
the imaging unit images the tip from the upper side to the lower side in the gravity direction through the mirror.

5. The automatic analyzer according to claim 1, further comprising:
a correcting unit that corrects a deviation between the lower end portion of the tip and a sample dispensing position based on an image obtained by the imaging unit.

6. The automatic analyzer according to claim 5, further comprising:
a transport unit that transports a sample container containing a sample to a predetermined position, wherein
the probe aspirates the sample from the sample container transported to the predetermined position, and
the correcting unit gives a correction value in a transport direction of the transport unit to the transport unit.

7. The automatic analyzer according to claim 6, further comprising:
a container holding device that holds the sample container when the probe aspirates the sample from the sample container, wherein
the transport unit moves along an X-axis direction on a horizontal plane,
the container holding device holds the sample container on the horizontal plane along a Y-axis direction perpendicular to the X-axis direction, and
the correcting unit gives a correction value in the X-axis direction to the transport unit and a correction value in the Y-axis direction to the container holding device.

8. The automatic analyzer according to claim 7, wherein
the probe is controlled so as to be regarded as moving along the X-axis direction in a minute region near the predetermined position, and
the correcting unit gives a correction value in the X-axis direction to the probe.

9. An automatic analyzer comprising:
a buffer that has a hole through which a tip for dispensing passes so as to hold the tip;
a probe for dispensing a sample that has a tip portion to which the tip is attached;
an imaging unit that is disposed to image the tip from an upper side to a lower side in a gravity direction;
a controller that controls the tip such that the tip is mounted on the probe by pressing the probe against the tip that passes through the hole to be held by the buffer; and
a correcting unit that corrects a deviation between the tip and a sample dispensing position based on an image captured by the imaging unit.

10. The automatic analyzer according to claim 9, further comprising:
a transport unit that transports a sample container containing a sample to a predetermined position, wherein
the probe aspirates the sample from the sample container transported to the predetermined position, and
the correcting unit gives a correction value in a transport direction of the transport unit to the transport unit.

11. The automatic analyzer according to claim 10, further comprising:
a container holding device that holds the sample container when the probe aspirates the sample from the sample container, wherein
the transport unit moves along an X-axis direction on a horizontal plane,
the container holding device holds the sample container on the horizontal plane along a Y-axis direction perpendicular to the X-axis direction, and
the correcting unit gives a correction value in the X-axis direction to the transport unit and a correction value in the Y-axis direction to the container holding device.

12. The automatic analyzer according to claim 11, wherein
the probe is controlled so as to be regarded as moving along the X-axis direction in a minute region near the predetermined position, and
the correcting unit gives a correction value in the X-axis direction to the probe.

* * * * *